United States Patent
Luo

(10) Patent No.: US 7,450,766 B2
(45) Date of Patent: Nov. 11, 2008

(54) CLASSIFIER PERFORMANCE

(75) Inventor: Huitao Luo, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 10/973,217

(22) Filed: Oct. 26, 2004

(65) Prior Publication Data

US 2006/0112038 A1  May 25, 2006

(51) Int. Cl.
G06K 9/62 (2006.01)
(52) U.S. Cl. .................. 382/224; 382/159; 382/118; 382/115
(58) Field of Classification Search .................. 382/224, 382/159, 118, 115
See application file for complete search history.

(56) References Cited

U.S. PATENT DOCUMENTS

| 6,205,247 | B1 | 3/2001 | Breuer et al. |
| 6,546,379 | B1 | 4/2003 | Hong et al. |
| 7,050,607 | B2 * | 5/2006 | Li et al. ............... 382/118 |
| 7,099,510 | B2 * | 8/2006 | Jones et al. ............ 382/225 |
| 2002/0102024 | A1 | 8/2002 | Jones et al. |
| 2002/0110279 | A1 * | 8/2002 | Dobeck ................ 382/228 |
| 2004/0013304 | A1 * | 1/2004 | Viola et al. ........... 382/224 |
| 2004/0066966 | A1 * | 4/2004 | Schneiderman ....... 382/159 |
| 2005/0013479 | A1 * | 1/2005 | Xiao et al. ............ 382/159 |
| 2005/0214760 | A1 * | 9/2005 | Chan et al. ............... 435/6 |

OTHER PUBLICATIONS

Yoav Freund et al., "A Short Introduction to Boosting," Journal of Japanese Society for Artificial Intelligence, 14(5):771-780 (Sep. 1999).
Paul Viola et al., "Rapid Object Detection using a Boosted Cascade of Simple Features," Conf. on Computer Vision & Pattern Recognition (2001).
Paul Viola et al., "Robust Real-time Object Detection," Cambridge Research Laboratory, Technical Report Series (Feb. 1999).

* cited by examiner

Primary Examiner—Matthew C. Bella
Assistant Examiner—Mike Rahmjoo

(57) ABSTRACT

Methods, machines, and machine readable media storing machine-readable instructions for improving classifier performance are described. In one aspect, threshold vectors $T_k = (t_{1k}, t_{2k}, \ldots, t_{nk})$ are input into a classifier that includes a cascade of n classification stages. Each classification stage i has a respective classification boundary that is controlled by a respective threshold $t_{ik}$, wherein $i=1, \ldots, n$, n has an integer value greater than 1, k is an integer, and each threshold vector $T_k$ corresponds to a respective operating point of the classifier. Threshold vectors corresponding to respective points on a receiver operating characteristic (ROC) curve approximating a target discrimination performance for multiple operating points of the classifier are identified.

45 Claims, 4 Drawing Sheets

CLASSIFIER PERFORMANCE

BACKGROUND

Classifiers are used in many application environments, including machine learning, pattern recognition, and data mining. In general, a classifier provides a function that maps (or classifies) an instance into one of multiple predefined potential classes. A classifier typically predicts one attribute of a set of instances given one or more attributes (or features). The attribute being predicted typically is called the label, and the attributes used for prediction typically are called descriptive attributes. A classifier typically is constructed by an inducer, which is a method that builds the classifier from a training set of sample data. The training set consists of samples containing attributes, one of which is the class label. After a classifier has been built, its structure may be used to classify unlabeled instances as belonging to one or more of the potential classes.

Many different classifiers have been proposed. In application environments in which the amount of negative data is much greater than the amount of positive data, it has been discovered that it is computationally more efficient to decompose a complex single-stage classifier into a cascade of relatively simple classification stages. Such a cascaded classifier typically is designed so that the initial classification stages efficiently reject negative instances, and the final classification stages in the cascade only process the positive instances and the negative instances that are hard to distinguish from positive instances. In cases where the number of negative instances far outnumbers the number of positive instances, such a cascaded classifier is much more efficient than classifiers that process each instance in a single stage.

In a typical cascaded classifier design, each classification stage has a respective classification boundary that is controlled by a respective threshold. The overall classification boundary of the classifier is changed whenever one or more of the thresholds for the individual classification stages are changed. In one cascaded classifier design, the classification stages initially are trained using the well-known AdaBoost inducing method, which provides an initial set of default threshold values for the classification stages. Each classification stage then is optimized individually by adjusting the default threshold value assigned to the classification that in a way that minimizes the incidence of false negatives (i.e., incorrect rejections of positive instances). In this design approach, however, there is no guarantee that the selected set of threshold values achieves an optimal performance for the sequence of classification stages as a whole.

SUMMARY

In one aspect, the invention features a method of improving classifier performance. In accordance with this inventive method, threshold vectors $T_k=(t_{1k}, t_{2k}, \ldots, t_{nk})$ are input into a classifier that includes a cascade of n classification stages. Each classification stage i has a respective classification boundary that is controlled by a respective threshold $t_{ik}$, wherein $i=1, \ldots, n$, n has an integer value greater than 1, k is an integer, and each threshold vector $T_k$ corresponds to a respective operating point of the classifier. Threshold vectors corresponding to respective points on a receiver operating characteristic (ROC) curve approximating a target discrimination performance for multiple operating points of the classifier are identified.

The invention also features a machine for implementing the above-described method of improving classifier performance and a machine-readable medium storing machine-readable instructions for causing a machine to implement the above-described method of improving classifier performance.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below enable the classification performance of a cascaded classifier to be improved by identifying the sets of threshold values that approximate an optimal mapping of the discrimination performance of the cascaded classifier. The particular operating points for the cascaded classifier may be selected based on the identified sets of threshold values to achieve optimal discrimination performance of the classifier under different constraints.

Figure 1:
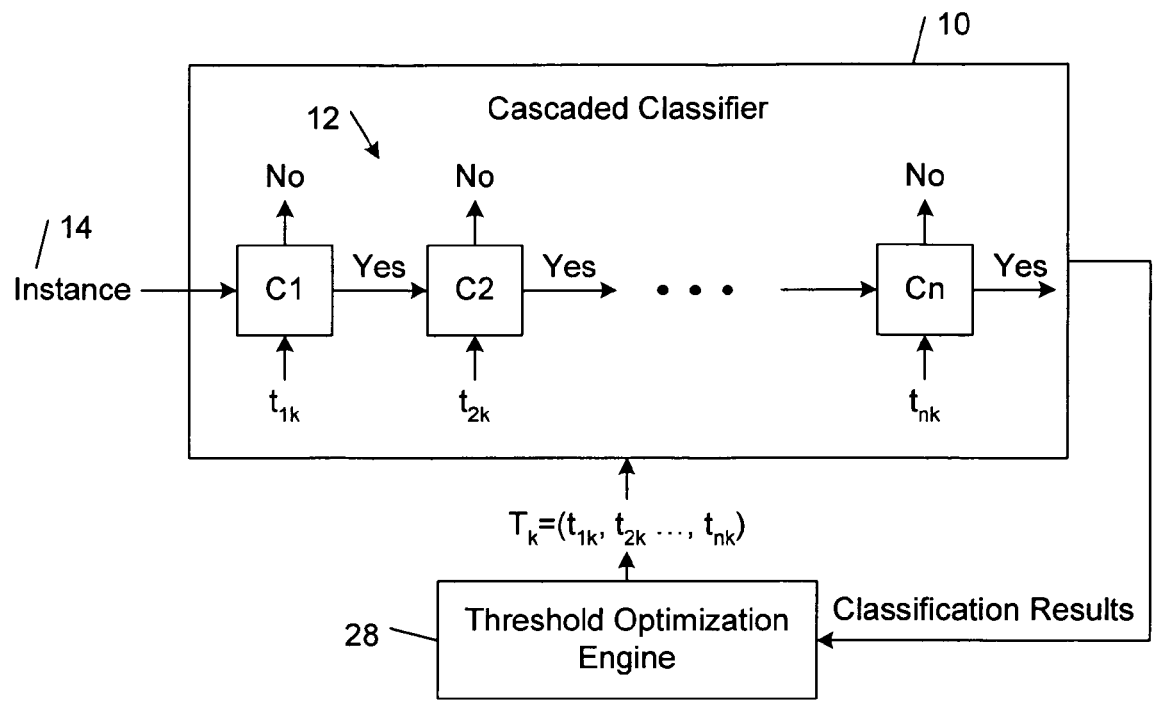
FIG. 1 is a block diagram of an embodiment of a cascaded classifier that includes a cascade of n classification stages and an embodiment of a threshold optimization engine that is configured to improve the performance of the cascaded classifier.

FIG. 1 shows an embodiment of a cascaded classifier 10 that includes a cascade 12 of n classification stages ($C_1$, $C_2, \ldots, C_n$), where n has an integer value greater than 1. Each classification stage $C_i$ has a respective classification boundary that is controlled by a respective threshold $t_{ik}$, where: i=1, ..., n; k=0, ..., m−1; and each of m and n has an integer value greater than 1. The variable k indexes sets k of threshold values corresponding to respective operating points of the classifier 10. In the illustrated embodiment, each of the classification stages ($C_1, C_2, ..., C_n$) performs a binary discrimination function that classifies an instance 14 into one of two classes (Yes or No) based on a discrimination measure that is computed from one or more attributes of the instance 14. The value of the computed discrimination measure relative to the corresponding threshold determines the class into which the instance 14 will be classified by each classification stage. In particular, if the discrimination measure that is computed for the instance 14 is above the threshold for a classification stage, the instance 14 is classified into one of the two classes whereas, if the computed discrimination measure is below the threshold, the instance 14 is classified into the other class.

In general, the cascaded classifier 10 may be designed to classify data instances that are relevant to any type of application environment, including machine learning, pattern recognition, and data mining.

Figure 2:
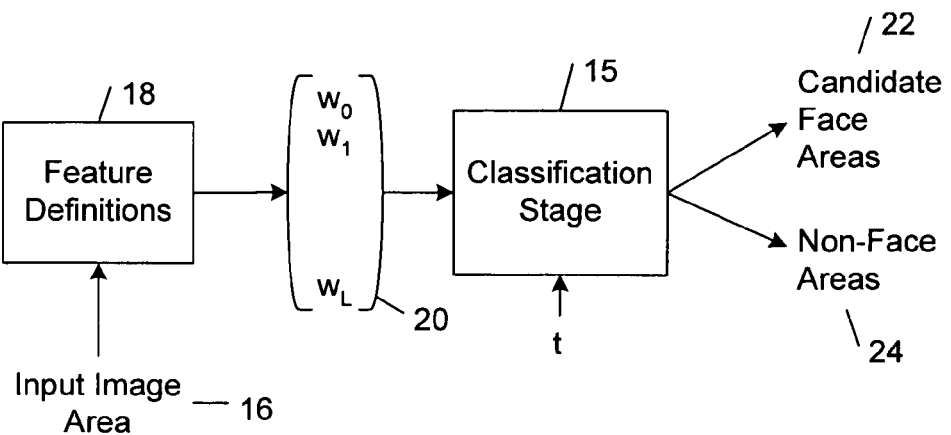
FIG. 2 is a diagrammatic view of an embodiment of a single classification stage in an implementation of the cascaded classifier shown in FIG. 1 that is designed to detect candidate face areas in an image.

FIG. 2 shows an exemplary embodiment of a single classification stage 15 in an implementation of the cascaded classifier 10 that is designed to detect candidate areas in an input image that are likely to contain faces. In this embodiment, data corresponding to an area 16 of an input image is projected into a feature space in accordance with a set of feature definitions 18. Input image area 16 includes any information relating to an area of an input image, including color values of input image pixels and other information derived from the input image needed to compute feature weights. Each feature is defined by a rule that describes how to compute or measure a respective weight ($w_0, w_1, ..., w_L$) for a candidate face area that corresponds to the contribution of the feature to the representation of the candidate face area in the feature space spanned by the set of features 18. The set of weights ($w_0, w_1, ..., w_L$) that is computed for a candidate face area constitutes a feature vector 20. The feature vector 20 is input into the classification stage 15. The classification stage 15 classifies the corresponding candidate face area into a set 22 of candidate face areas or a set 24 of non-faces. The instances that are in the set 22 of candidate face areas are then passed to the next classification stage, which implements a different discrimination function.

In some implementations, the classification stage 15 implements a discrimination function that is defined in equation (1):

$$\sum_{l=1}^{L} g_l h_l(x) > 0 \qquad (1)$$

where x contains values corresponding to the input image area 16 and $g_l$ are weights that the classification stage 15 applies to the corresponding threshold function $h_l(x)$, which is defined by:

$$h_l(x) = \begin{cases} 1, & \text{if } p_l w_l(x) > p_l t_l \\ 0, & \text{otherwise} \end{cases} \qquad (2)$$

The variable $p_l$ has a value of +1 or −1 and the function w(x) is an evaluation function for computing the features of the feature vector 20.

Referring back to FIG. 1, each set k of values for the thresholds ($t_{1k}, t_{2k}, ..., t_{nk}$) of the classifier 10 defines a respective threshold vector $T_k=(t_{1k}, t_{2k}, ..., t_{nk})$ that corresponds to a respective operating point of the classifier 10. Each of the operating points of the classifier 10 is characterized by a respective overall discrimination performance. The discrimination performance of the classifier 10 may be measured by a receiver operating characteristic (ROC) curve, which measures the prediction results of the classifier as the threshold vector T is varied. In some implementations, the ROC curve corresponds to a mapping of measures of correct detection performance (e.g., correct detection rate or true positive rate) of the classifier to corresponding measures of false positive performance (e.g., false positive rate) of the classifier as the threshold vector T is varied.

In general, each threshold vector $T_k$ has n threshold variables $t_{ik}$ that correspond to n basis vectors $e_i$ spanning an n-dimensional space $R^n$, where i=1, ..., n. Each threshold vector $T_k$ therefore can be varied along any n-dimensional path in the space $R^n$. In order to optimize the overall performance of the classifier 10, it is necessary to identify threshold vectors that define the operating points of the classifier 10 that lie on an ROC curve that represents an optimal discrimination performance of the classifier 10 in terms of a selected set of one or more evaluation criteria.

Figure 3:
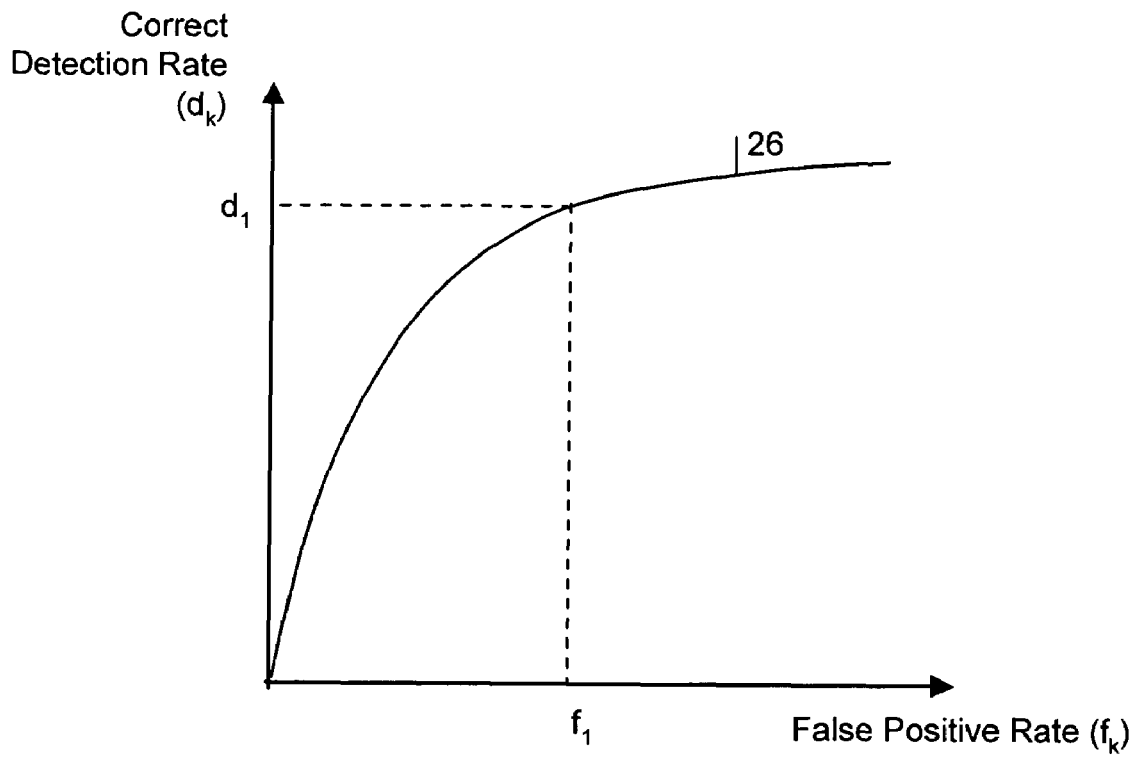
FIG. 3 is a graph of an exemplary target mapping of maximal correct detection performance values to corresponding false positive performance values for the cascaded classifier of FIG. 1.

FIG. 3 shows graph of an exemplary ROC curve 26 that corresponds to an optimal discrimination performance of the classifier 10 that is defined in terms of maximal correct detection performance values for given false positive performance values for the cascaded classifier 10. In one exemplary implementation, the ROC curve 26 maps a set of false positive rates $f(T_k) \leq f_k$ to a set of corresponding correct detection rates $d(T_k)=d_k$ that are optimal, where $0 \leq f_k \leq 1$, $0 \leq d_k \leq 1$, $f(T_k)$ represents the false positive rate of classifier 10 that is associated with the threshold vector $T_k$, $d(T_k)$ represents the correct detection rate of classifier 10 that is associated with the threshold vector $T_k$, and $T_k$ corresponds to the set of threshold vectors $T_k=(t_{1k}, t_{2k}, ..., t_{nk})$ that achieves the target discrimination performance for the classifier 10. That is, for any threshold vector $T_k' \neq T_k$ where $T_k' \in R^n$ and $f(T_k') \leq f_k$, $d(T_k') \leq d(T_k)=d_k$. The exemplary ROC curve 26 corresponds to the plot of optimal operating points $\{(d_k, f_k)\}_k$.

FIG. 1 also shows an embodiment of a threshold optimization engine 28 that is configured to improve the performance of the cascaded classifier 10 by identifying threshold vectors that correspond to respective points on an ROC curve approximating a target discrimination performance of the classifier 10. In general, the threshold optimization engine 28 is not limited to any particular hardware or software configuration, but rather it may be implemented in any computing or processing environment, including in digital electronic circuitry or in computer hardware, firmware, device driver, or software. For example, in some implementations the threshold optimization engine 28 is implemented as one or more respective software modules operating on a computer. In other implementations, the threshold optimization engine 28 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

It is noted that the terms "correct detection rate" and "false positive rate" may be used interchangeably with the terms "correct detection number" and "false positive number", respectively, when the size of the training set that is used by the threshold optimization engine 28 is fixed. Thus, in implementations where the size of the training set is fixed, the optimization process that is executed by the threshold optimization engine 28 may be formulated in terms of a discrete search space rather than a continuous search space, increasing the ease with which the threshold optimization engine can be implemented.

Figure 4:
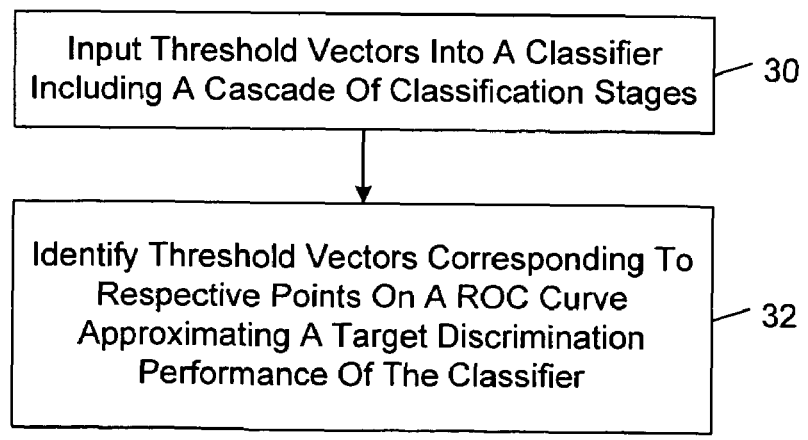
FIG. 4 is a flow diagram of an embodiment of a method of improving the performance of the cascaded classifier of FIG. 1.

FIG. 4 shows an embodiment of a method by which the threshold optimization engine 28 improves the performance of the cascaded classifier 10. In accordance with this method, the threshold optimization engine 28 inputs threshold vectors $T_k$ into the cascaded classifier 10 (block 30). The threshold optimization engine 28 then identifies threshold vectors corresponding to respective points on a ROC curve approximating a target discrimination performance for multiple operating points of the classifier (block 32).

Figure 5:
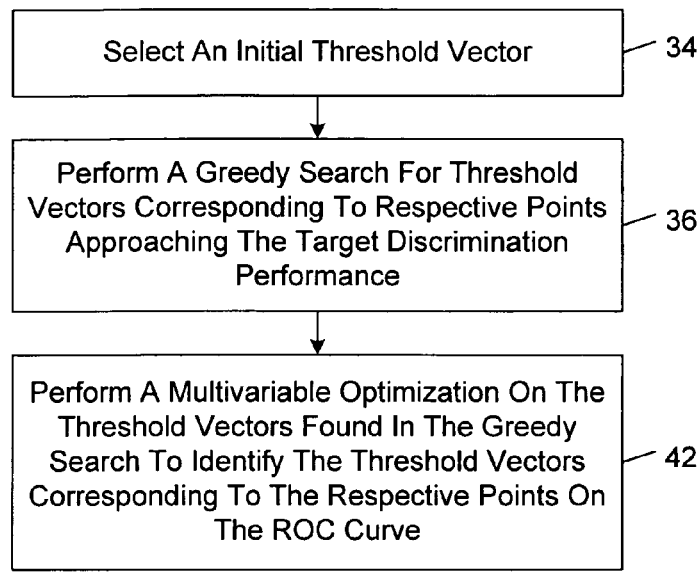
FIG. 5 is a flow diagram of an embodiment of a method of identifying threshold vectors corresponding to respective points on an ROC curve approximating a target classification performance mapping of the type shown in FIG. 3.

FIG. 5 shows an embodiment of the performance optimization process. In this embodiment, the threshold optimization engine 28 starts with an initial threshold vector (block 34). For example, in the implementations in which the AdaBoost inducing method is used to initially train the classification stages of classifier 10, the threshold optimization engine 28 may start with the default threshold vector that is generated by the AdaBoost inducing method. The threshold optimization engine 28 then generates a series of new threshold vectors from the initial threshold vector in a search for threshold vectors that improve the performance of the classifier 10.

The threshold optimization engine 28 initially performs a greedy search for threshold vectors corresponding to respective points approaching the target discrimination performance (block 36). In the illustrated embodiments, the target discrimination performance corresponds to the points on the target ROC curve 26, which maps maximal correct detection performance values to given false positive performance values for the cascaded classifier 10. The greedy search process (block 36) attempts to approximate the target ROC curve 26 by generating a series of threshold vectors from an initial threshold vector $T_0$. The series of threshold vectors corresponds to a series of operating points for the classifier such that each successive threshold moves the operating point closer to the target ROC curve 26.

Figure 6A:
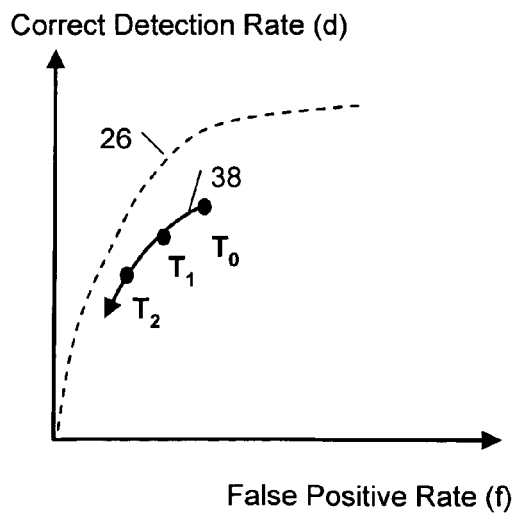
FIG. 6A shows a graph of an exemplary ROC curve that is generated by a greedy search process relative to a graph of the exemplary target classification performance mapping shown in FIG. 3.
Figure 6B:
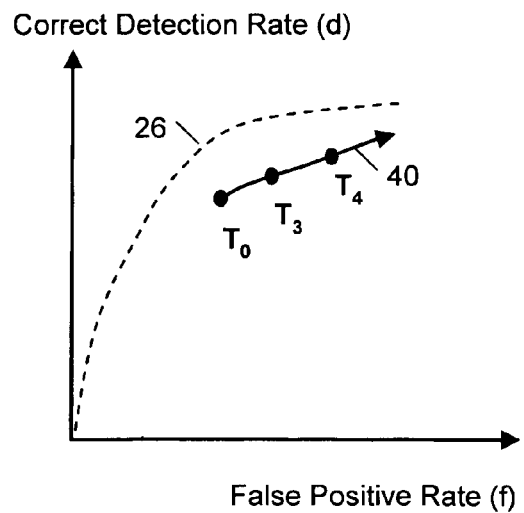
FIG. 6B shows another graph of an exemplary ROC curve that is generated by a greedy search process relative to a graph of the exemplary target classification performance mapping shown in FIG. 3.

Referring to FIGS. 6A and 6B, at each step of the greedy search process (block 36), a current threshold vector $T_k$ is modified in a selected basis vector direction $e_j$ in $R^n$ corresponding to the threshold value of classification stage j, where $j=1,\ldots,n$. In some implementations, the successive threshold vectors $T_{k+1}$ are derived in accordance with:

$$T_{k+1}=T_k+(\Delta t)e_j \qquad (3)$$

where $\Delta t$ has a small empirically determined scalar value and $T_k$ is the current threshold vector that is modified in the $k^{th}$ iteration of the greedy search. Without loss of generality, for each classification stage i of the classifier 10, both the correct detection rate d and the false positive rate f increase monotonically when the corresponding controlling threshold $t_i$ increases. Therefore, when $\Delta t<0$, $d(T_{k+1}) \leqq d(T_k)$ and $f(T_{k+1}) \leqq f(T_k)$. Conversely, when $\Delta t>0$, $d(T_{k+1}) \geqq d(T_k)$ and $f(T_{k+1}) \geqq f(T_k)$. FIG. 6A shows the series of threshold vectors $(T_0, T_1, T_2)$ that is identified during an exemplary greedy search when $\Delta t<0$. FIG. 6B shows the series of threshold vectors $(T_0, T_3, T_4)$ that is identified during an exemplary greedy search when $\Delta t>0$.

As shown in FIGS. 6A and 6B, the successive threshold vectors that are identified during each iteration of the greedy search process move the corresponding ROC curves 38, 40 closer to the target ROC curve 26. During each greedy search iteration, the basis vector direction $e_j$ is selected based on an indicator of the rate of movement of the operating point of the classifier when changing from $T_k$ to $T_{k+1}$. In some implementations, the movement rate indicator is given by:

$$S(T_{k+1}, T_k) = \frac{d(T_{k+1})-d(T_k)}{f(T_{k+1})-f(T_k)} \qquad (4)$$

where $d(T_k)$ and $f(T_k)$ are values for the correct detection performance and the false positive performance of the classifier at an operating point corresponding to a threshold vector $T_k$. The movement rate indicator $S(T_{k+1}, T_k)$ that is defined in equation (4) roughly corresponds to the slope of the ROC curves 38, 40 between the operating points $T_k$ and $T_{k+1}$. In these implementations, the selected basis vector $e_j$ yields a smaller value for $S(T_{k+1}, T_k)$ (i.e., a smaller slope) than all other basis vectors $e_{i \neq j}$ when $\Delta t<0$ because in this case a modification that achieves the smallest slope value moves the ROC curve 28 closest to the target ROC curve 26. Similarly, the selected basis vector $e_j$ yields a larger value for $S(T_{k+1}, T_k)$ (i.e., a larger slope) than all other basis vectors $e_{i \neq j}$ when $\Delta t>0$ because in this case a modification that achieves the largest slope value moves the ROC curve 28 closest to the target ROC curve 26.

The greedy search process (block 36) generates a series of threshold vectors that approximate the target ROC curve 26. The series of threshold vectors may be generated by identifying points above and below the initial threshold vector $(T_0)$, as shown in FIGS. 6A and 6B. In some implementations, the greedy search process is repeated until the threshold vectors that are identified during each greedy search iteration converge. In these implementations, each successive greedy search iteration uses the threshold vectors that were identified in the preceding iteration as a starting point.

Referring back to FIG. 5, after the greedy search process has been performed (block 36), the threshold optimization engine 28 performs a multidimensional optimization on the threshold vectors that are found in the greedy search process to identify the threshold vectors corresponding to the respective points on the ROC curve approximating the target discrimination performance of the classifier (block 42). The optimization method may be any one of a wide variety of multidimensional optimization methods, including a downhill simplex optimization method, a simulated annealing optimization method, and a steepest descent optimization method.

In some implementations, the multidimensional optimization method determines the threshold vectors that minimize a cost function that measures the performance of the classifier 10. In some of these implementations, the cost function measures the weighted difference between the false positive rate and the correct detection rate of the classifier 10 in accordance with equation (5):

$$W(T)=f(T)-h \times d(T) \qquad (5)$$

where h is a scalar greater than 0 and d(T) and f(T) are values for the correct detection performance and the false positive performance of the classifier 10 at an operating point corresponding to a threshold vector T.

In these implementations, the threshold vectors that minimize the cost function W(T) are determined in accordance with a downhill simplex optimization process. The downhill simplex optimization process uses the threshold vectors that are identified in the greedy search process (block 36) as the initial starting points. A simplex is defined as a shape having n+1 vertices in the n-dimensional search space $R^n$ and corresponds to a solution in the search space $R^n$. In general, the downhill simplex method repeatedly replaces the threshold vector having the lowest objective function value in a simplex with another threshold vector.

The downhill simplex method involves expanding, contracting, and reflecting the simplex in a series of random steps. In this process, the downhill simplex method identifies the threshold vectors $T_{HIGH}$ and $T_{LOW}$ where the objective function W(T) is highest and lowest, respectively. The downhill simplex optimization process evolves from the initial state (e.g., a threshold vector identified by the greedy search process, and a selected value for the scalar weighting factor h) by performing one or more of the following actions: reflecting away from low; reflecting with expansion away from low; contracting along one dimension from low; and contracting along all dimensions from low. For example, the downhill simplex optimization process may begin by reflecting the simplex about the low point $T_{LOW}$. If the resulting simplex reduces the objective function W(T), the simplex is expanded in the same direction; otherwise, if the resulting simplex increases the objective function W(T) above the objective function at the second lowest point, the downhill simplex method operates on an intermediate point. If the objective function is not additionally reduced after a preselected number of steps, the simplex is contracted, and the process is repeated.

In other implementations, the cost function in equation (5) may be replaced with the following cost function:

$$W'(T) = \log(f(T)) - h \times \log(d(T)) \quad (6)$$

where h is a scalar greater than 0 and d(T) and f(T) are values for the correct detection performance and the false positive performance of the classifier 10 at an operating point corresponding to a threshold vector T. The threshold vectors that minimize the cost function W'(T) may be determined in accordance with a downhill simplex optimization process, as described above in connection with the cost function W(T).

The output of each downhill simplex process corresponds to one point on the final ROC curve that is output from the threshold optimization engine 28. Additional points on the final ROC curve are generated by identifying the threshold vectors that minimize W(T) for different values of the scalar weighting factor h. The downhill simplex optimization process may be repeated for each of the threshold vectors identified in the greedy search process (block 36).

Figure 7:
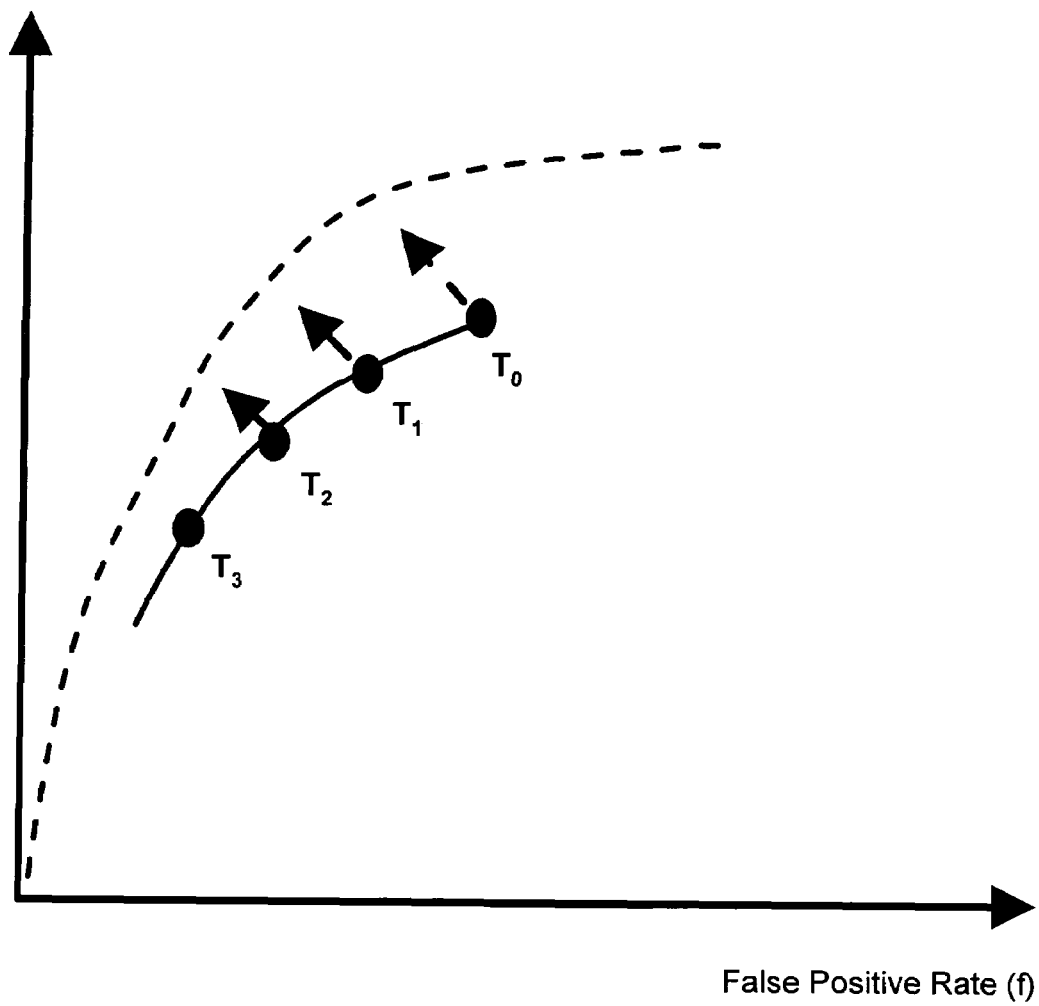
FIG. 7 shows a diagrammatic indication of the operating points of the cascaded classifier of FIG. 1 moving from a set of operating points found in a greedy search toward the graph of the exemplary target classification performance mapping shown in FIG. 3 as a result of a multidimensional optimization process.

FIG. 7 shows a diagrammatic indication of the operating points of the cascaded classifier 10 moving from a set of operating points ($T_0, T_1, T_2, T_3$) that were found in the greedy search process (block 36) toward the graph of the exemplary target classification performance mapping 26 shown in FIG. 3 as a result of performing the multidimensional optimization process on the set of threshold vectors ($T_0, T_1, T_2, T_3$).

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the methods may be implemented in assembly or machine language, if desired. In any case, the processing language may be a compiled or interpreted language. The methods described herein may be performed by a computer processor executing instructions organized, for example, into process modules to carry out these methods by operating on input data and generating output.

What is claimed is:

1. A computer-implemented method of improving classifier performance, comprising:

providing a classifier comprising a cascade of n classification stages, each classification stage i having a respective classification boundary controlled by a respective threshold $t_{ik}$, wherein i=1, ..., n, n has an integer value greater than 1, k is a variable that indexes threshold vectors $T_k = (t_{1k}, t_{2k}, ..., t_{nk})$ in an n-dimensional space spanned by the thresholds $t_i$, and each of the threshold vectors $T_k$ corresponds to a respective operating point of the classifier;

determining ones of the threshold vectors $T_k$ in the n-dimensional space based on a function that produces a value that depends on and varies with correct detection performance and false positive performance at one or more operating points of the classifier; and outputting one or more of the determined threshold vectors.

2. The method of claim 1, wherein the function identifies threshold vectors corresponding to respective points on a receiver operating characteristic (ROC) curve approximating a mapping of maximal correct detection performance values for the classifier to corresponding false positive performance values for the classifier.

3. The method of claim 1, wherein the determining comprises performing a greedy search for threshold vectors corresponding to respective points approaching the target discrimination performance.

4. The method of claim 3, wherein the performing of the greedy search comprises selecting a series of threshold vectors incrementally moving the operating point of the classifier closer to the target discrimination performance.

5. The method of claim 4, wherein the selecting of the series of threshold vectors comprises modifying a selected threshold value $t_{jk}$ of a threshold vector $T_k$ to generate a threshold vector $T_{k+1}$, where j=1, ... n.

6. The method of claim 5, wherein $T_{k+1} = T_k + (\Delta t)e_j$, where $e_j$ is a selected basis vector corresponding to the threshold value of classification stage j, and $\Delta t$ has a scalar value.

7. The method of claim 6, wherein the function is a movement rate indicator function that provides an indicator of rate of movement of the operating point of the classifier when changing from $T_k$ to $T_{k+1}$, and the basis vector $e_j$ is selected based on the movement rate indicator function.

8. The method of claim 7, wherein the movement rate indicator function is given by:

$$S(T_{k+1}, T_k) = \frac{d(T_{k+1}) - d(T_k)}{f(T_{k+1}) - f(T_k)}$$

where $d(T_k)$ and $f(T_k)$ are values for the correct detection performance and the false positive performance of the classifier at an operating point corresponding to a threshold vector $T_k$.

9. The method of claim 8, wherein the selected basis vector $e_j$ yields a smaller value for $S(T_{k+1}, T_k)$ than all other basis vectors $e_{\ne j}$ when $\Delta t<0$, and the selected basis vector $e_j$ yields a larger value for $S(T_{k+1}, T_k)$ than all other basis vectors $e_{1\ne j}$ when $\Delta t>0$.

10. The method of claim 3, further comprising repeating the greedy search until the threshold vectors identified in each greedy search iteration converge.

11. The method of claim 1, wherein the function is a cost function measuring performance of the classifier and the determining comprises determining ones of the threshold vectors that minimize the cost function.

12. A method of improving classifier performance, comprising:
inputting threshold vectors $T_k=(t_{1k}, t_{2k}, \ldots, t_{nk})$ into a classifier comprising a cascade of n classification stages, each classification stage i having a respective classification boundary controlled by a respective threshold $t_{1k}$, wherein i=1, ..., n, n has an integer value greater than 1, k is an integer, and each threshold vector $T_k$ corresponds to a respective operating point of the classifier; and
identifying threshold vectors corresponding to respective points on a receiver operating characteristic (ROC) curve approximating a target discrimination performance for multiple operating points of the classifier, wherein the identifying of the threshold vectors comprises determining a threshold vector minimizing a cost function measuring performance of the classifier.

13. The method of claim 12, wherein the cost function is given by $W(T)=f(T)-h\times d(T)$, where h is a scalar greater than 0 and d(T) and f(T) are values for the correct detection performance and the false positive performance of the classifier at an operating point corresponding to a threshold vector T.

14. The method of claim 12, wherein the cost function is given by $W(T)=\log(f(T))-h\times\log(d(T))$, where h is a scalar greater than 0 and d(T) and f(T) are values for the correct detection performance and the false positive performance of the classifier at an operating point corresponding to a threshold vector T.

15. The method of claim 12, wherein the determining of the threshold vector comprises minimizing the cost function in accordance with a multidimensional optimization process.

16. The method of claim 15, wherein the cost function is minimized in accordance with a downhill simplex optimization process.

17. A method of improving classifier performance, comprising:
inputting threshold vectors $T_k=(t_{1k}, t_{2k}, \ldots, t_{nk})$ into a classifier comprising a cascade of n classification stages, each classification stage i having a respective classification boundary controlled by a respective threshold $t_{ik}$, wherein i=1, ..., n, n has an integer value greater than 1, k is an integer, and each threshold vector $T_k$ corresponds to a respective operating point of the classifier; and
identifying threshold vectors corresponding to respective points on a receiver operating characteristic (ROC) curve approximating a target discrimination performance for multiple operating points of the classifier, wherein the identifying of the threshold vectors comprises performing a greedy search for threshold vectors corresponding to respective operating points of the classifier approaching the target discrimination performance, and performing a multidimensional optimization on the threshold vectors found in the greedy search to identify the threshold vectors corresponding to the respective points on the ROC curve.

18. A machine for improving classifier performance, comprising digital electronic circuitry implementing at least one data processing module configured to perform computer process operations comprising:
providing a classifier comprising a cascade of n classification stages, each classification stage i having a respective classification boundary controlled by a respective threshold $t_{1k}$, wherein i=1, ..., n, n has an integer value greater than 1, k is variable that indexes threshold vectors $T_k=(t_{1k}, t_{2k}, \ldots, t_{nk})$ in an n-dimensional space spanned by the thresholds $t_1$, and each of the threshold vectors $T_k$ corresponds to a respective operating point of the classifier;
determining ones of the threshold vectors $T_k$ in the n-dimensional space based on a function that produces a value that depends on and varies with correct detection performance and false positive performance at one or more operating points of the classifier; and
outputting one or more of the determined threshold vectors.

19. The machine of claim 18, wherein the function identifies threshold vectors corresponding to respective points on a receiver operating characteristic (ROC) curve approximating a mapping of maximal correct detection performance values for the classifier to corresponding false positive performance values for the classifier.

20. The machine of claim 18, wherein the at least one data processing module is configured to perform a greedy search for threshold vectors corresponding to respective points approaching the target discrimination performance.

21. The machine of claim 20, wherein the at least one data processing module is configured to select a series of threshold vectors incrementally moving the operating point of the classifier closer to the target discrimination performance.

22. The machine of claim 21, wherein the at least one data processing module is configured to modify a selected threshold value $t_{jk}$ of a threshold vector $T_k$ to generate a threshold vector $T_{k+1}$, where j=1, ... n.

23. The machine of claim 22, wherein $T_{k+1}=T_k+(\Delta t)e_j$, where $e_j$ is a selected basis vector corresponding to the threshold value of classification stage j.

24. The machine of claim 23, wherein the function is a movement rate indicator function that provides an indicator of rate of movement of the operating point of the classifier when changing from $T_k$ to $T_{k+1}$, and the at least one data processing module is configured to select the basis vector $e_j$ based on the movement rate indicator function.

25. The machine of claim 24, wherein the movement rate indicator function is given by:

$$S(T_{k+1}, T_k) = \frac{d(T_{k+1}) - d(T_k)}{f(T_{k+1}) - f(T_k)}$$

where $d(T_k)$ and $f(T_k)$ are values for the correct detection performance and the false positive performance of the classifier at an operating point corresponding to a threshold vector $T_k$.

26. The machine of claim 25, wherein the selected basis vector $e_j$ yields a smaller value for $S(T_{k+1}, T_k)$ than all other basis vectors $e_{1\ne j}$ when $\Delta t<0$, and the selected basis vector $e_j$ yields a larger value for $S(T_{k+1}, T_k)$ than all other basis vectors $e_{1\ne j}$ when $\Delta t>0$.

27. The machine of claim 18, wherein the function is a cost function measuring performance of the classifier and the at least one data processing module is configured to determine ones of the threshold vectors that minimize the cost function.

28. The machine of claim 27, wherein the cost function is given by $W(T)=f(T)-h\times d(T)$, where h is a scalar greater than 0 and $d(T)$ and $f(T)$ are values for the correct detection performance and the false positive performance of the classifier at an operating point corresponding to a threshold vector T.

29. The machine of claim 27, wherein the at least one data processing module is configured to minimize the cost function in accordance with a multidimensional optimization process.

30. The machine of claim 29, wherein the cost function is minimized in accordance with a downhill simplex optimization process.

31. The machine of claim 18, wherein the at least one data processing module is configured to perform a greedy search for threshold vectors corresponding to respective operating points of the classifier approaching the target discrimination performance, and perform a multidimensional optimization on the threshold vectors found in the greedy search to identify the threshold vectors corresponding to the respective points on the ROC curve.

32. A computer-readable medium storing machine-readable instructions for causing a machine to perform operations comprising:
providing a classifier comprising a cascade of n classification stages, each classification stage i having a respective classification boundary controlled by a respective threshold $t_{1k}$, wherein i=1, ..., n, n has an integer value greater than 1, k is a variable that indexes threshold vectors $T_k=(t_{1k}, t_{2k}, \ldots, t_{nk})$ in an n-dimensional space spanned by the thresholds $t_j$, and each of the threshold vectors $T_k$ corresponds to a respective operating point of the classifier;
determining ones of the threshold vectors $T_k$ in the n-dimensional space based on a function that produces a value that depends on and varies with correct detection performance and false positive performance at one or more operating points of the classifier; and
outputting one or more of the determined threshold vectors.

33. The computer-readable medium of claim 32, wherein the function identifies threshold vectors corresponding to respective points on a receiver operating characteristic (ROC) curve approximating a mapping of maximal correct detection performance values for the classifier to corresponding false positive performance values for the classifier.

34. The computer-readable medium of claim 32, wherein the machine-readable instructions cause the machine to perform a greedy search for threshold vectors corresponding to respective points approaching the target discrimination performance.

35. The computer-readable medium of claim 34, wherein the machine-readable instructions cause the machine to select a series of threshold vectors incrementally moving the operating point of the classifier closer to the target discrimination performance.

36. The computer-readable medium of claim 35, wherein the machine-readable instructions cause the machine to modify a selected threshold value $t_{jk}$ of a threshold vector $T_k$ to generate a threshold vector $T_{k+1}$, where j=1, ... n.

37. The computer-readable medium of claim 36, wherein $T_{k+1}=T_k+(\Delta t)e_j$, where $e_j$ is a selected basis vector corresponding to the threshold value of classification stage j.

38. The computer-readable medium of claim 37, wherein the function is a movement rate indicator function that provides an indicator of rate of movement of the operating point of the classifier when changing from $T_k$ to $T_{k+1}$, and the machine-readable instructions cause the machine to select the basis vector $e_j$ based on the movement rate indicator function.

39. The computer-readable medium of claim 38, wherein the movement rate indicator function is given by:

$$S(T_{k+1}, T_k) = \frac{d(T_{k+1}) - d(T_k)}{f(T_{k+1}) - f(T_k)}$$

where $d(T_k)$ and $f(T_k)$ are values for the correct detection performance and the false positive performance of the classifier at an operating point corresponding to a threshold vector $T_k$.

40. The computer-readable medium of claim 39, wherein the selected basis vector $e_j$ yields a smaller value for $S(T_{k+1}, T_k)$ than all other basis vectors $e_{1\neq j}$ when $\Delta t<0$, and the selected basis vector $e_j$ yields a larger value for $S(T_{k+1}, T_k)$ than all other basis vectors $e_{1\neq j}$ when $\Delta t>0$.

41. The computer-readable medium of claim 32, wherein the function is a cost function measuring performance of the classifier and the machine-readable instructions cause the machine to determine ones of the threshold vectors that minimize the cost function.

42. The computer-readable medium of claim 41, wherein the machine-readable instructions cause the machine to minimize the cost function in accordance with a multidimensional optimization process.

43. The computer-readable medium of claim 42, wherein the cost function is minimized in accordance with a downhill simplex optimization process.

44. The computer-readable medium of claim 41, wherein the cost function is given by $W(T)=f(T)-h\times d(T)$, where h is a scalar greater than 0 and $d(T)$ and $f(T)$ are values for the correct detection performance and the false positive performance of the classifier at an operating point corresponding to a threshold vector T.

45. The computer-readable medium of claim 32, wherein the machine-readable instructions cause the machine to perform a greedy search for threshold vectors corresponding to respective operating points of the classifier approaching the target discrimination performance, and perform a multidimensional optimization on the threshold vectors found in the greedy search to identify the threshold vectors corresponding to the respective points on the ROC curve.

* * * * *

UNITED STATES PATENT AND TRADEMARK OFFICE
CERTIFICATE OF CORRECTION

PATENT NO. : 7,450,766 B2 Page 1 of 1
APPLICATION NO. : 10/973217
DATED : November 11, 2008
INVENTOR(S) : Huitao Luo It is certified that error appears in the above-identified patent and that said Letters Patent is hereby corrected as shown below:

In column 8, line 15, in Claim 1, delete "$t_{1k}$" and insert -- $t_{ik}$ --, therefor.

In column 9, line 1, in Claim 9, delete "$e_{\neq j}$" and insert -- $e_{i \neq j}$ --, therefor.

In column 9, line 2, in Claim 9, delete "$e_{1 \neq j}$" and insert -- $e_{i \neq j}$ --, therefor.

In column 9, line 18, in Claim 12, delete "$t_{1k}$" and insert -- $t_{ik}$ --, therefor.

In column 10, line 8, in Claim 18, delete "$t_{1k}$" and insert -- $t_{ik}$ --, therefor.

In column 10, line 9, in Claim 18, insert -- a -- before "variable".

In column 10, line 11, in Claim 18, delete "$t_1$" and insert -- $t_i$ --, therefor.

In column 10, line 63, in Claim 26, delete "$e_{1 \neq j}$" and insert -- $e_{i \neq j}$ --, therefor.

In column 10, line 65, in Claim 26, delete "$e_{1 \neq j}$" and insert -- $e_{i \neq j}$ --, therefor.

In column 11, line 29, in Claim 32, delete "$t_{1k}$" and insert -- $t_{ik}$ --, therefor.

In column 11, line 32, in Claim 32, delete "$t_j$" and insert -- $t_i$ --, therefor.

In column 12, line 27, in Claim 40, delete "$e_{1 \neq j}$" and insert -- $e_{i \neq j}$ --, therefor.

In column 12, line 29, in Claim 40, delete "$e_{1 \neq j}$" and insert -- $e_{i \neq j}$ --, therefor.

Signed and Sealed this

Seventh Day of April, 2009

JOHN DOLL
*Acting Director of the United States Patent and Trademark Office*